United States Patent [19]
Kedzior et al.

[11] 3,729,124
[45] Apr. 24, 1973

[54] APPARATUS FOR REDUCING THE WELD BUILD-UP ON SEAM WELDED TUBING

[75] Inventors: Edward S. Kedzior, Northford; Thomas J. Latham, Jr., Wallingford; John Boris, Meriden, all of Conn.

[73] Assignee: Allegheny Ludlum Industries, Inc., Pittsburgh, Pa.

[22] Filed: Apr. 5, 1971

[21] Appl. No.: 131,203

[52] U.S. Cl. ............... 228/19, 29/33 D, 29/477.7, 113/116 UT, 219/61
[51] Int. Cl. ............................................. B23k 5/22
[58] Field of Search ............... 228/19, 5, 15, 17; 72/39; 219/62, 6, 61; 29/33 D, 477, 477.7; 113/116 UT

[56] References Cited

UNITED STATES PATENTS 1,611,875   12/1926   Belmont ........................... 228/19
1,884,467   10/1932   Windsor ............................ 228/19

Primary Examiner—J. Spencer Overholser
Assistant Examiner—Robert J. Craig
Attorney—Vincent G. Gioia and Robert F. Dropkin

[57] ABSTRACT

Apparatus for reducing weld build-up on seam welded tubing by the use of interior and exterior pressure rolls. The exterior pressure rolls are of the hourglass-type and engage opposite sides of the tubing, one of the exterior hourglass rolls having a center line in contact with the exterior of the seam weld. The interior rolls, usually three in number, are carried on a mandrel, two of the three rolls being concave in configuration and engaging the inner surface of the tubing opposite the weld. The third interior roll is backed up by the first two and engages the inner side of the weld. This third roll is convex, conforms to the inner periphery of the tube, and is on the center line and directly opposite the hourglass roll which engages the exterior of the weld.

5 Claims, 5 Drawing Figures

Patented April 24, 1973

3,729,124

INVENTORS.
EDWARD S. KEDZIOR,
THOMAS J. LATHAM, JR.,
& JOHN BORIS
By Vincent G. Gioia
Attorney INVENTORS.
EDWARD S. KEDZIOR,
THOMAS J. LATHAM JR.,
& JOHN BORIS
By *Vincent G. Gioia*
Attorney

APPARATUS FOR REDUCING THE WELD BUILD-UP ON SEAM WELDED TUBING

BACKGROUND OF THE INVENTION

In the continuous seam welding of tubing, flat skelp or strip is curved upwardly by forming rolls into a cylindrical shape having its opposite edges forming an open seam which is thereafter welded to form the completed tube. In the usual welding process, the edges of the strip are heated by a welding torch, or by electric resistance or high frequency induction methods, and thereafter forced together to form the weld. In this process, an undesirable build-up of metal will inherently occur at the weld along the entire length of the tube and projects from the inner and outer peripheries of the tube; whereas smooth and uninterrupted inner and outer peripheries are desired.

In the past, attempts have been made to eliminate the weld protrusions on the inner and outer peripheries of the tube by passing the weld between opposed pressure rolls, one of which is carried on a mandrel interiorly of the traveling tube and the other of which, an hourglass roll, engages the outer periphery. In prior art devices of this type, there were two rolls carried on the mandrel, one directly beneath the other. Each of the two rolls had a generally concave peripheral rolling surface in order to conform to the inner periphery of the tube; however this meant that only point contact could be achieved between the rolls. This resulted in a torsional force which caused the interior rolls carried on the mandrel to shift angularly to positions at which no weld reduction was taking place. Furthermore, since only two rolls were used, the roll diameters had to be directly related to the tube or pipe diameter.

SUMMARY OF THE INVENTION

The present invention provides an improved means for reducing interior and exterior weld build-up on a seam welded tubing by the use of interior and exterior rolls, which apparatus eliminates the difficulties experienced with prior art devices of this type. Specifically, the apparatus of the invention eliminates or minimizes the aforesaid torsional shifting of the interior mandrel rolls due to point contact of one roll with another.

In accordance with the invention, there is provided an exterior hourglass roll which engages the outer surface of the weld bead, a stationary mandrel extending into the formed tube, and at least three rolls carried on the mandrel interiorly of the tubular element. One of the three interior rolls has a convex rolling surface which engages the side of the weld bead opposite the exterior weld. The other two of the interior rolls engage the inner periphery of the tubular element on the side thereof opposite the weld bead and have concave rolling surfaces which engage the convex rolling surface of the first roll. In this manner, the upper mandrel roll engages the concave surfaces of the two lower rolls along a pair of arcs which prevent skewing or torsional twisting of the mandrel assembly and maintain the upper roll in pressure contact with the underside of the weld.

In the preferred embodiment of the invention, the underside of the tube, beneath the mandrel and the upper hourglass roll, is backed up by a cluster of rolls to prevent bending of the tubular element under the force of the outer weld-engaging roll which is forced downwardly by a hydraulic cylinder or the like.

The above and other objects and features of the invention will become apparent from the following detailed description taken in connection with the accompanying drawings which form a part of this specification, and in which.

Figure 1:
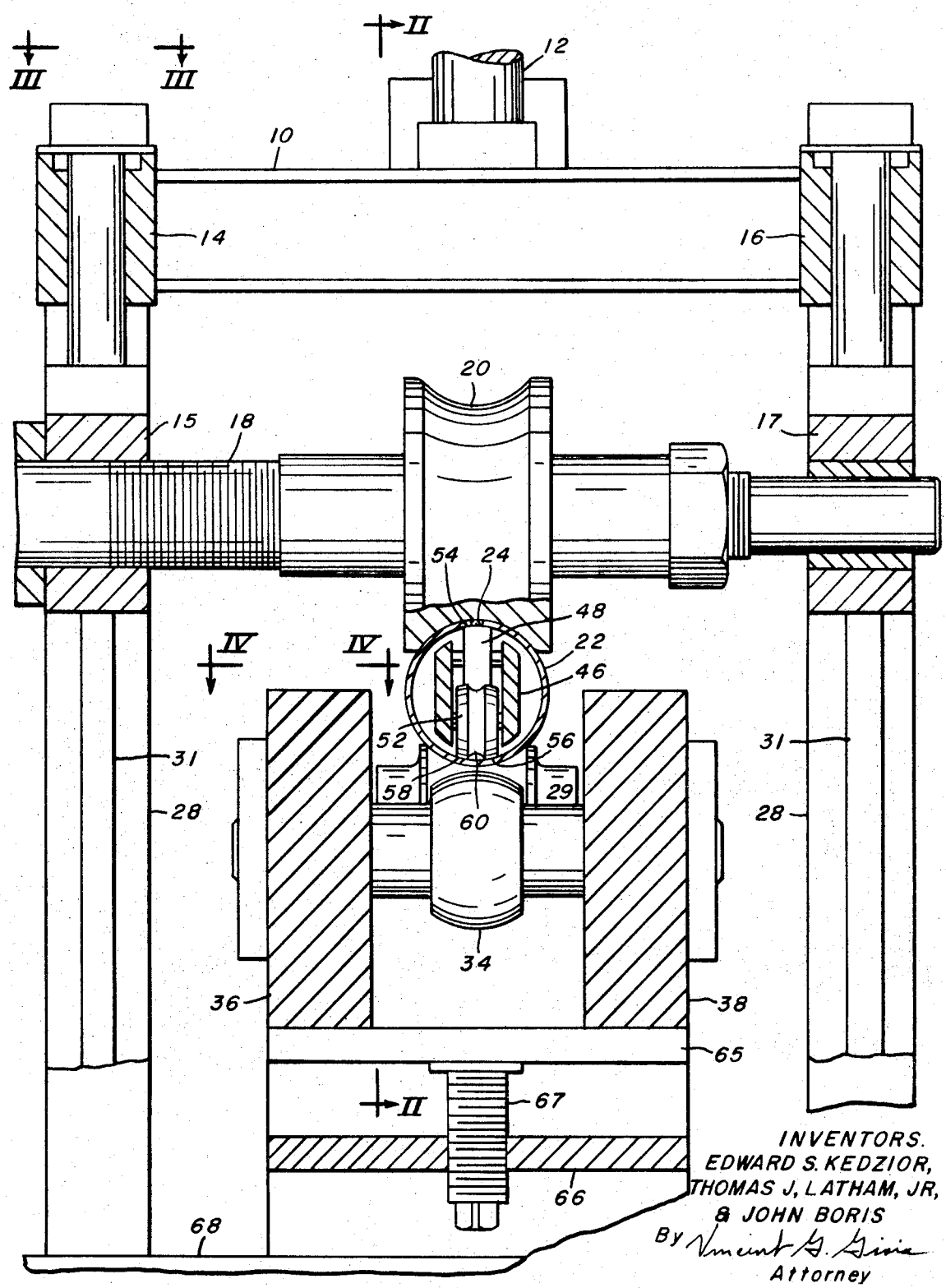
FIG. 1 is an end view of the apparatus of the invention.
Figure 2:
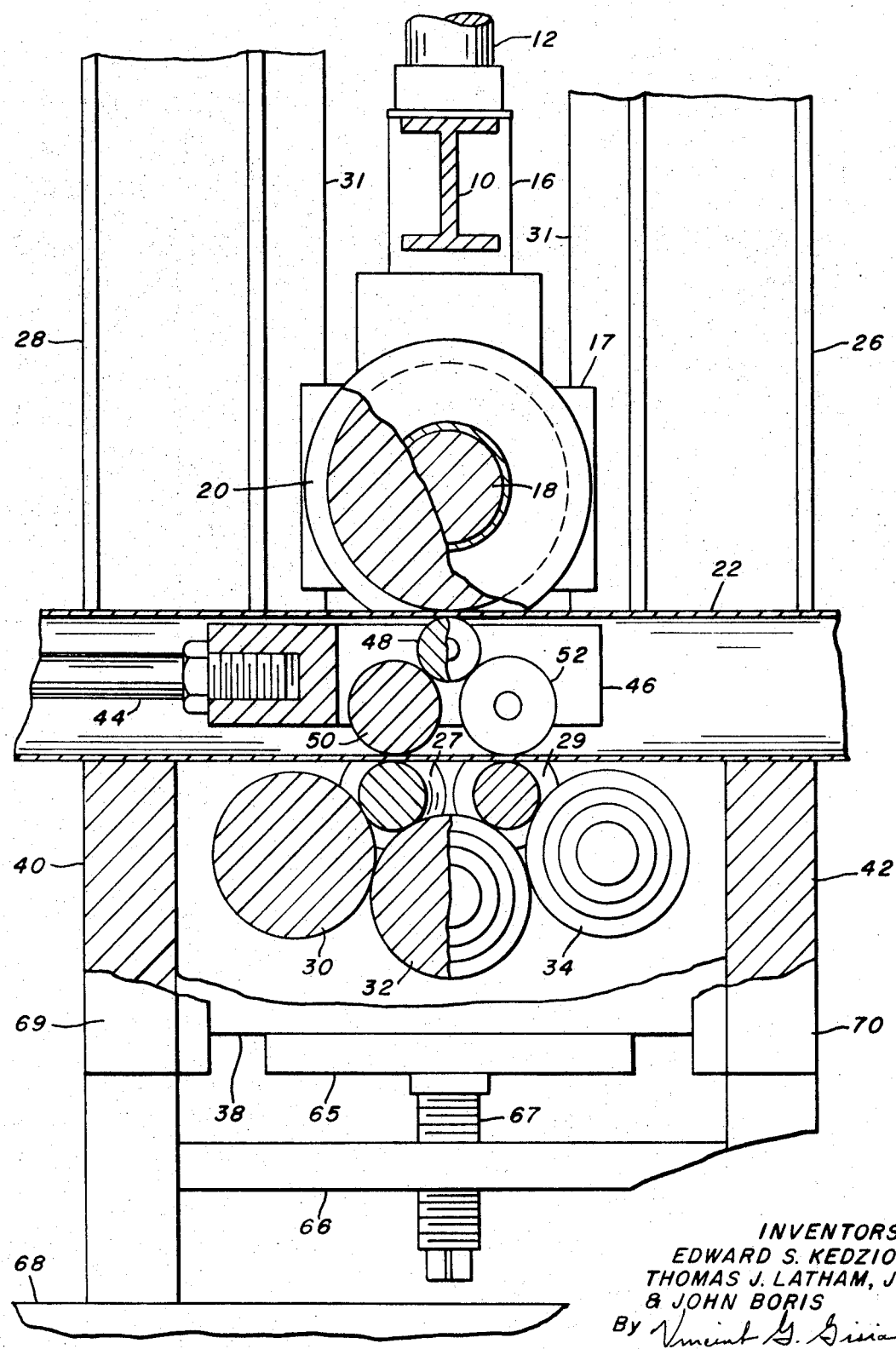
FIG. 2 is a cross-sectional view taken substantially along line II—II of FIG. 1 and showing part of the weld flattening and back-up rolls of the invention in elevation and part in section.

With reference now to the drawings, and particularly to FIGS. 1 and 2, the apparatus shown includes an upper U-shaped frame having a thrust beam 10 connected to the lower end of a piston rod 12 of a force-exerting cylinder, not shown. The thrust beam 10 is connected at its opposite ends to T-bolt assemblies 14 and 16 which carry, at their lower extremities, blocks 15 and 17 which support the opposite ends of a shaft 18. The shaft 18, in turn, carries an upper rotatable hourglass pressure roll 20 which engages the periphery of a seam welded tube 22 and has a center line coincident with the weld seam 24 formed in the tube. Preferably, the shaft 18 does not rotate and the roll 22 is mounted thereon on roller bearings.

Figure 3:
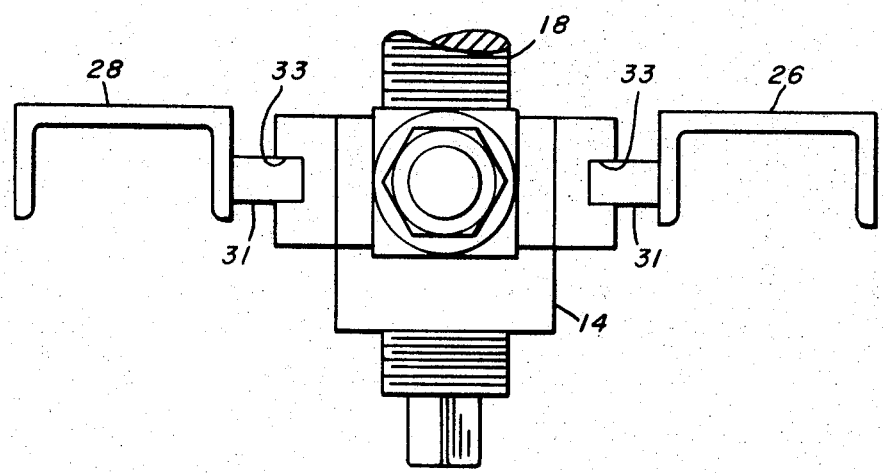
FIG. 3 is a top view taken substantially along line III—III of FIG. 1 showing the support means for the upper pressure roll of the invention.

The T-bolt assemblies 14 and 16 are carried, as shown in FIGS. 1-3, by upstanding channel members 26 and 28, there being two channel members 26 and 28 on either side of the pressure roll 20. As shown in FIG. 3, each of the channel members is provided with a guideway 31 which fits into a slot 33 formed in the block 15 or 17 which carries an end of the shaft 18. In this manner, the thrust beam 10 and the T-bolt assemblies 14 and 16 can slide upwardly or downwardly on the guideways 31. During a weld flattening operation, the cylinder connected to piston rod 12 exerts a constant downward force on the beam 10. This force is transmitted through the T-bolt assemblies 14 and 16 to shaft 18 and the hourglass roll 20.

Figure 4:
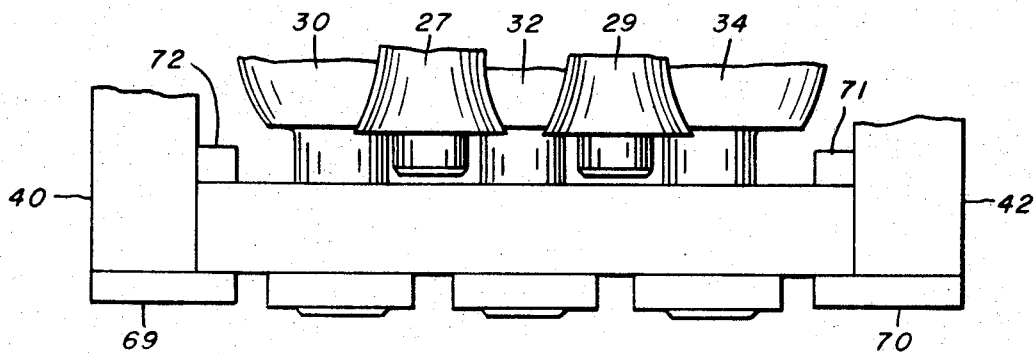
FIG. 4 is a top view of the end portions of the back-up rolls taken substantially along line IV—IV of FIG. 1.

Beneath the seam welded tube 22, as is perhaps best shown in FIG. 2, is a cluster of five rolls. Hourglass rolls 27 and 29 engage the periphery of the tube 22 on the underside thereof and are backed up by three rolls 30, 32 and 34, each having a convex rolling surface which fits into the concave rolling surface of an associated one of the two rolls 27 or 29. The rolls 27 and 29, as best shown in FIG. 1, are carried in suitable bearings within supporting blocks 36 and 38. The blocks 36 and 38 are joined at their bottoms by means of connector plate 65. End plates 40 and 42 are joined by means of crossplate 66 and base plate 68 (FIG. 2). Retaining plates 69 and 70 and guide bars 71 and 72 (FIG. 4) are joined to end plates 40 and 42. Blocks 36 and 38 can then slide upwardly or downwardly by means of adjusting screw 76 which engages the connector plate 65

(FIG. 2). The assembly of cluster rolls can then be adjusted for proper engagement with the periphery of the tube 22.

Figure 5:
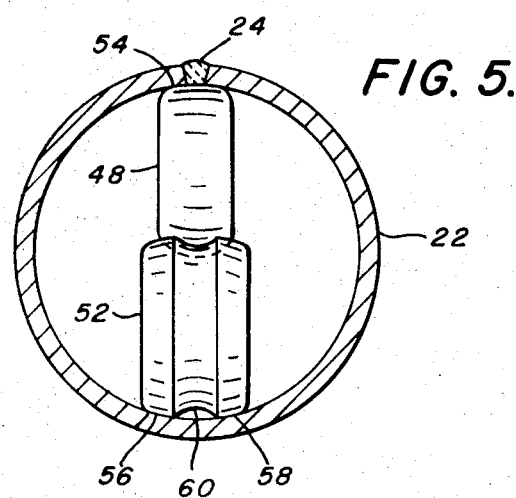
FIG. 5 is an enlarged end view of the interior weld-engaging rolls of the invention.

As was explained above, the tube 22 is formed from flat skelp which is formed into a tubular shape having an open seam along its length. This seam then passes beneath a welding torch where it is welded. Thereafter, the weld passes beneath the pressure roll 20. Extending into the welded tube 22 from the open end thereof (i.e., that end at which the flat skelp is formed into a tubular shape) is a mandrel 44 which, as shown in FIG. 2, carries at its forward end a carriage 46. The carriage 46, in turn, carries a cluster of three rolls 48, 50 and 52, shown also in FIGS. 1 and 4. The roll 48 has a convex rolling surface 54 (FIG. 5) which rolls against the underside of the weld 24. The remaining two rolls 50 and 52 have convex rolling surface portions 56 and 58 which engage the inner periphery of the tube 22 on the side thereof opposite the weld 24. Intermediate the convex rolling surface portions 56 and 58 is a concave rolling surface portion 60 on each roll 50 and 52 which engages the convex rolling surface 54 of the upper roll 48. With this arrangement, it will be appreciated that the roll 48 engages rolls 50 and 52 along arcs and that exceptionally good back-up is provided for the roll 48. Furthermore, since roll 48 rolls within the concave portions 60 of the rolls 50 and 52, it will not skew or twist and will remain on the center line of the weld 24.

In the practice of the invention, the tube 22, which moves continuously while it is being welded, passes beneath the upper pressure roll 20 which exerts a downward force on the tube. At the same time, the cluster of rolls 48–52, as backed up by rolls 27–34, exerts an upward force which effectively flattens the weld 24 without skewing or twisting as explained above.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. In apparatus for continuous seam welding of tubular elements wherein skelp is formed into a cylindrical shape having its opposite edges forming a seam which is welded to form the completed tube, the combination of means for reducing the interior and exterior weld bead which is formed lengthwise of the tubular element along the seam comprising:
   an exterior hourglass roll engaging the outer surface of the weld bead,
   a stationary mandrel extending into said tubular element, and
   at least three rolls carried on said mandrel interiorly of said tubular element, one of said rolls having a convex rolling surface which engages the side of said weld bead opposite said exterior roll and the other two of which engage the inner periphery of the tubular element on the side thereof opposite said weld bead and which have concave rolling surfaces which engage the convex rolling surface of the first roll.

2. The apparatus of claim 1 including hourglass back-up rolls engaging the outer periphery of the tube opposite said other two rolls carried interiorly of the tubular element.

3. The apparatus of claim 2 including additional back-up rolls for said hourglass back-up rolls, said latter-mentioned back-up rolls having convex rolling surfaces which engage the concave rolling surfaces of said hourglass back-up rolls.

4. The apparatus of claim 3 wherein said hourglass roll which engages the outer surface of the weld bead is movable toward and away from said tubular element, and including pressure means for forcing said hourglass roll which engages the outer surface of the weld bead downwardly against the weld bead.

5. The apparatus of claim 1 wherein the concave rolling surface on each of the other two interior rolls carried on said mandrel is disposed between convex rolling surface portions which engage the inner periphery of said tubular element.

* * * * *